Aug. 5, 1941.   J. McINTYRE ET AL   2,251,521
BRAKE OPERATING MEANS
Filed Feb. 3, 1941   3 Sheets—Sheet 1

Inventor
Jack McIntyre
Wayne C. Doran
By *Clarence A. O'Brien*

Attorney

Aug. 5, 1941.  J. McINTYRE ET AL  2,251,521
BRAKE OPERATING MEANS
Filed Feb. 3, 1941  3 Sheets-Sheet 2

Inventor
Jack McIntyre
Wayne C. Doran
By Clarence A. O'Brien
Attorney

Patented Aug. 5, 1941

2,251,521

UNITED STATES PATENT OFFICE 2,251,521

BRAKE OPERATING MEANS

Jack McIntyre and Wayne C. Doran, Westfield, Pa.

Application February 3, 1941, Serial No. 377,234

1 Claim. (Cl. 188—162)

The present invention relates to new and useful improvements in means for operating the brakes of motor vehicles, particularly the emergency brake, and has for its primary object to provide, in a manner as hereinafter set forth, an apparatus of this character comprising a novel construction and arrangement whereby a conventional reversible electric motor may be employed for applying or setting and releasing the brake.

Another very important object of the invention is to provide a brake operating means of the aforementioned character embodying a unique electric system whereby the brake, after it has been set, may be released only when the ignition switch of the vehicle is closed.

Still another very important object of the invention is to provide a brake operating means of the character described which comprises an electric signal for automatically indicating when the emergency brake is set.

Other objects of the invention are to provide a brake operating means of the character set forth which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
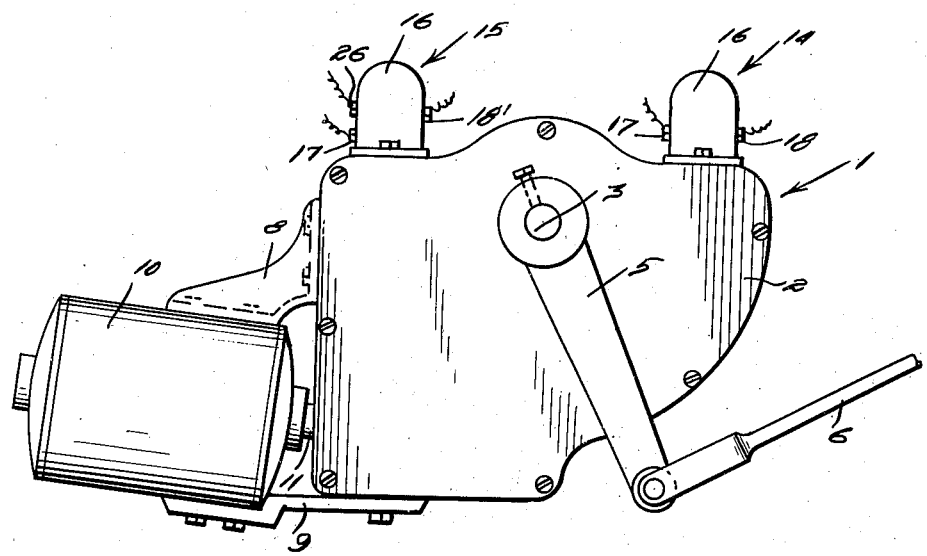
Figure 1 is a view in side elevation of a brake operating means constructed in accordance with the present invention.
Figure 2:
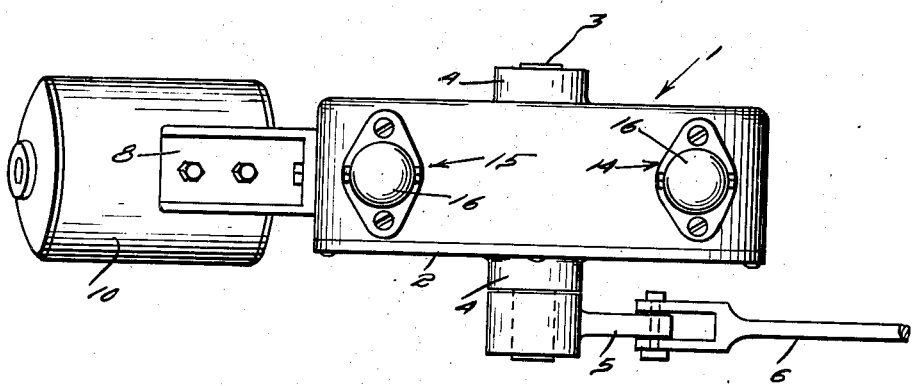
Figure 2 is a top plan view thereof.

Referring now to the drawings in detail, it will be seen that the embodiment of the invention which has been illustrated comprises a metallic housing which is designated generally by the reference numeral 1. The housing 1 is relatively narrow and comprises a removable side plate 2.

Mounted transversely in the housing 1 is a shaft 3 which is journaled in suitable bearings 4. One end portion of the shaft 3 projects beyond its respective bearing 4 and has fixed thereon an arm 5. A rod 6 operatively connects the arm 5 to the emergency brake of the vehicle.

Fixed on the shaft 3 for operation in the housing 1 is a segmental gear 7. Mounted on one end of the housing 1 through the medium of upper and lower brackets 8 and 9, respectively, is a suitable reversible electric motor 10. The shaft 11 of the electric motor 10 extends rotatably into the lower portion of the housing 1 and has fixed thereon a worm gear 12 which drives the segmental worm gear 7. A bearing 13 is provided for the motor shaft 11 in the housing 1.

Mounted on top of the housing 1, adjacent the ends thereof, are automatic switches 14 and 15 which are normally closed. In the embodiment shown, each of the switches 14 and 15 includes a casing 16 of insulating material having mounted therein electric contacts 17 and 18, in the case of switch 14 and 17', 18' in the case of switch 15, contacts 18, 18' being resilient. Plungers 19 extend slidably into the housing 1 from the lower portion of the casing 16 and are engageable beneath the resilient contact 18, 18' for disengaging same from the stationary contacts 17, 17'. The plungers 19 of the switches 14 and 15 are located in the path of the segmental worm gear 7 for engagement by the ends thereof.

Figure 7:
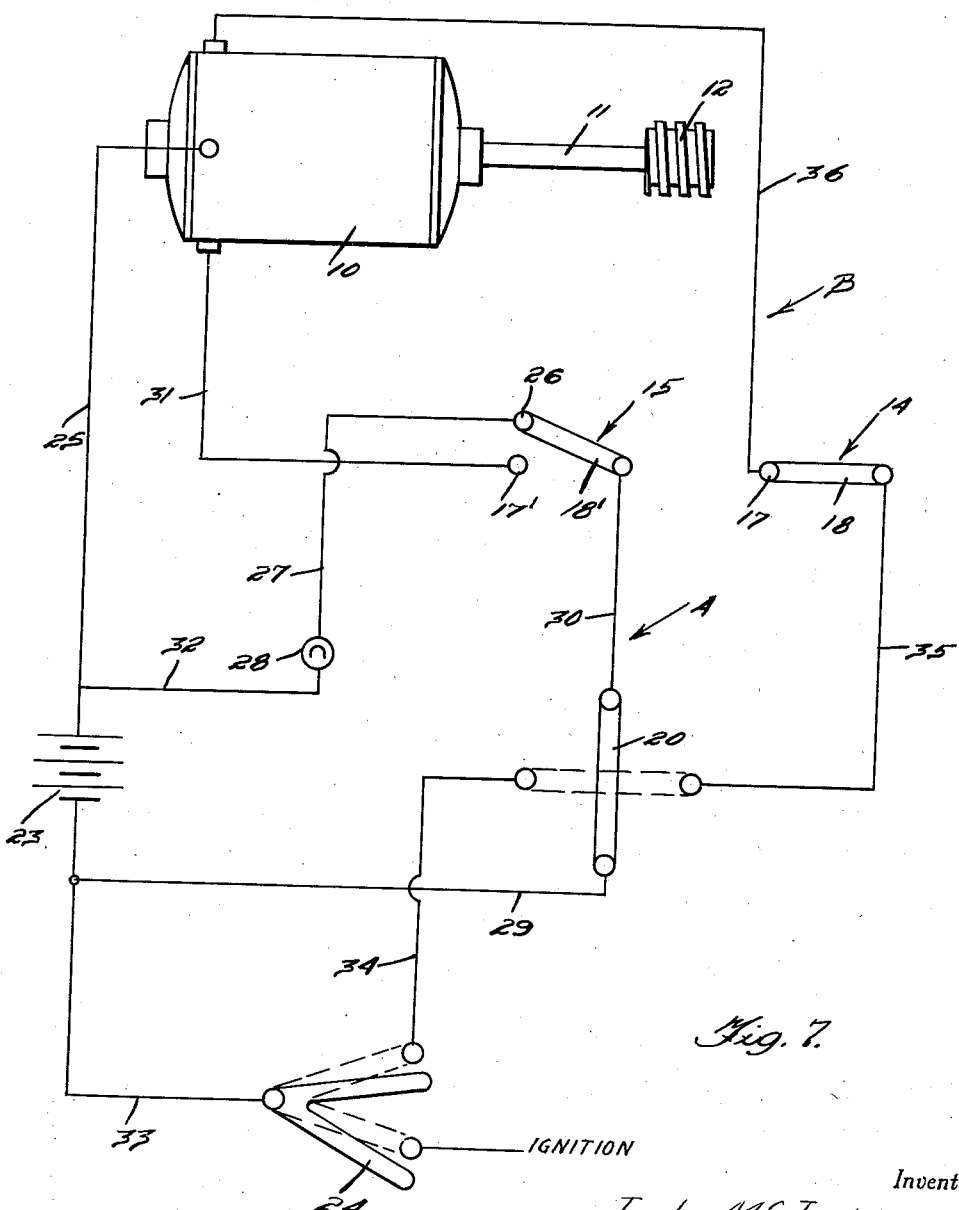
Figure 7 is a diagrammatic view of the electric system.

Referring now to Figure 7 of the drawings, it will be seen that electric circuits A and B connect the opposite sides of the motor 10 to the positive side of the usual storage battery 23 of the vehicle. The circuit A is for setting the brake and comprises the stop switch 15 and a manually operated reversing switch 20. A conductor wire 29 connects one of the poles of the switch 20 to the positive side of the battery 23. A conductor wire 30 connects the switch 20 to the contact or pole 18' of the switch 15. A conductor wire 31 connects the contact or pole 17' of the switch 15 to one side of the reversible electric motor 10. The switch 15 also includes a contact 26 with which the resilient contact 18' of this switch is engageable. A wire 27 connects the contact 26 to one side of a telltale light 28 which is suitably located on the instrument panel of the vehicle. A wire 32 connects the other side of the telltale light 28 to the negative side of the battery 23.

The circuit B is for releasing the brake and includes the stop switch 14, the switch 20, and the ignition switch 24 of the vehicle. A conductor wire 33 connects the ignition switch 24 to the positive side of the battery 23. A wire 34 connects the ignition switch 24 to a pole of the reversing switch 20. The opposite pole of the switch 20 is connected by a wire 35 to the contact 18 of the switch 14. The contact 17 of the switch 14 is connected by a wire 36 to the other side of the motor 10. A return wire 25 connects the motor 10 to the negative side of the battery 23.

Figure 3:
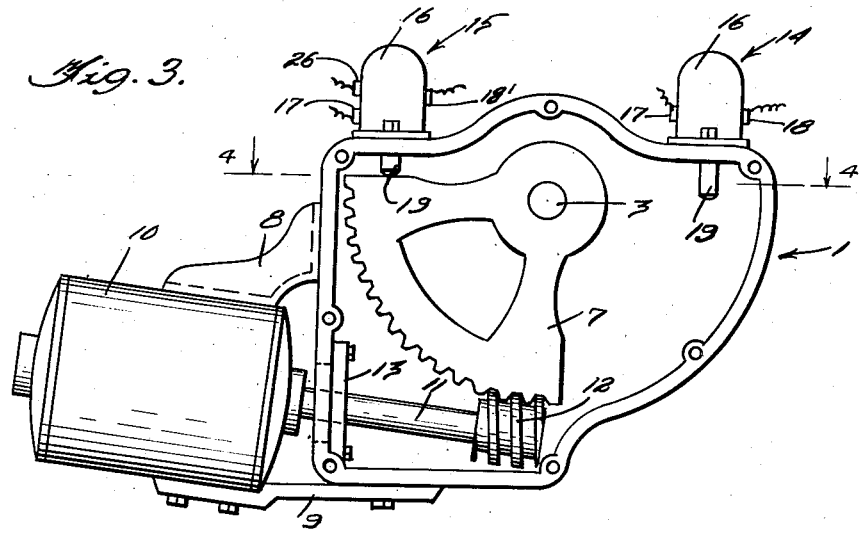
Figure 3 is a view in side elevation of the device with the removable side plate omitted from the housing to expose the elements in said housing.
Figure 4:
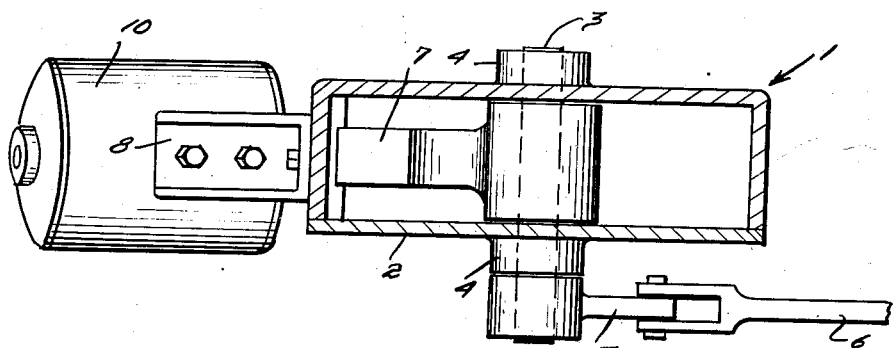
Figure 4 is a view in horizontal section, taken substantially on the line 4—4 of Figure 3.
Figures 5, 6:
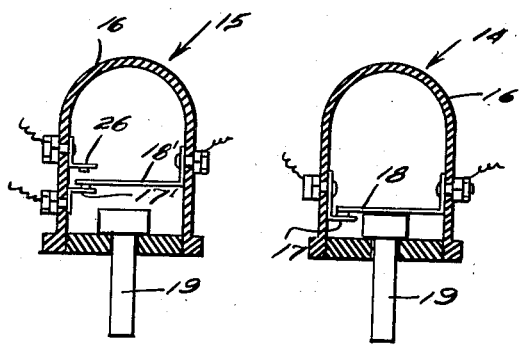
Figures 5 and 6 are views in vertical section through the gear controlled switches.

In operation, the brake is set by setting the switch 20 in the position shown in full lines in the drawings. At this time the contacts 18' and 17' of the switch 15 are closed and current flows from the battery 23 through the circuit A to one side of the motor 10, returning through the wire 25 to said battery. Thus, the segmental gear 7 is swung to the position illustrated in Figure 3 of the drawings. When the segmental gear 7 reaches this position it opens the contacts 18' and 17' of the switch 15 for deenergizing the motor 10 and closes the contacts 18' and 26 of said switch 15 for energizing the telltale light 28. The switch 14 is now closed. To release the brake, the ignition switch 24 is closed and the switch 20 is set in the position shown in dotted lines in the drawings. The current now flows from the battery 23 through the release circuit B to the opposite side of the motor 10 for reversing same, thereby releasing the brake. When the brake is released the segmental gear 7 engages and opens the switch 14 for stopping the electric motor 10. The housing 1 may be mounted in position on the vehicle in any suitable manner.

It is believed that the many advantages of a brake operating means constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A device of the character described comprising a brake operating means including a member adapted to occupy brake applying and brake releasing positions, a reversible electric motor operatively connected to said member, a source of electrical energy, a reversing switch connected between said motor and said source, stop switches connected between said reversing switch and said motor, said stop switches being normally closed to condition operation of the motor, means operated by said member in its extreme brake applying and brake releasing positions for opening the corresponding stop switch to deenergize the motor, and a telltale connected between said source and one of said stop switches, the last named stop switch including a normally open circuit closer connected between said source and said last named stop switch, said circuit closer being arranged to be closed by said member to energize the telltale while said member is in its brake applying position.

JACK McINTYRE.
WAYNE C. DORAN.